United States Patent
Wang et al.

(10) Patent No.: US 9,284,040 B2
(45) Date of Patent: Mar. 15, 2016

(54) SELF-TIGHTENING ROTOR

(71) Applicant: SZ DJI TECHNOLOGY CO., Ltd, Shenzhen (CN)

(72) Inventors: Tao Wang, Shenzhen (CN); Tao Zhao, Shenzhen (CN); Zhi Gang Ou, Shenzhen (CN)

(73) Assignee: SZ DJI TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 14/718,021

(22) Filed: May 20, 2015

(65) Prior Publication Data

US 2016/0016654 A1     Jan. 21, 2016

Related U.S. Application Data

(63) Continuation of application No. 14/167,735, filed on Jan. 29, 2014, now Pat. No. 9,057,273, which is a continuation of application No. PCT/CN2014/070333, filed on Jan. 8, 2014.

(30) Foreign Application Priority Data

May 31, 2013   (CN) .................... 2013 2 0311523 U

(51) Int. Cl.
*F01D 5/02*   (2006.01)
*B64C 11/04*   (2006.01)
*B64C 39/02*   (2006.01)

(52) U.S. Cl.
CPC ............ *B64C 11/04* (2013.01); *B64C 39/024* (2013.01); *B64C 2201/108* (2013.01)

(58) Field of Classification Search
CPC ...... B64C 11/02; B64C 11/04; B64C 39/024; B64C 2201/108; B64C 2201/27; F01D 5/021; F01D 5/025; F04D 29/263; F04D 29/329; F04D 29/32; A63H 27/001; A63H 27/02
See application file for complete search history.

(56) References Cited

U.S. PATENT DOCUMENTS 1,400,032 A    12/1921 Daniel
2,421,254 A *  5/1947 Froelich ................ F04D 29/263
                                                403/197

(Continued)

FOREIGN PATENT DOCUMENTS

CN    202358299 U    8/2012
CN    202756299 U    2/2013

(Continued)

OTHER PUBLICATIONS

European search report and opinion dated Nov. 4, 2014 for EP Application No. 14165032.5.

(Continued)

*Primary Examiner* — Dwayne J White
*Assistant Examiner* — Joshua R Beebe
(74) *Attorney, Agent, or Firm* — Wilson Sonsini Goodrich & Rosati

(57) ABSTRACT

Systems, methods, and devices for propelling self-propelled movable objects are provided. In one aspect, a rotor assembly for a self-propelled movable object comprises: a hub comprising a first fastening feature; a drive shaft comprising a second fastening feature and directly coupled to the hub by a mating connection of the first and second fastening features, wherein the drive shaft is configured to cause rotation of the hub such that the mating connection of the first and second fastening features is tightened by the rotation; and a plurality of rotor blades coupled to the hub and configured to rotate therewith to generate a propulsive force.

22 Claims, 15 Drawing Sheets

I-I

(56) References Cited

U.S. PATENT DOCUMENTS

| | | | |
|---|---|---|---|
| 2,563,020 A | | 8/1951 | Gemeinhardt |
| 3,061,341 A | * | 10/1962 | Grzych ................... B64C 11/04 242/571.7 |
| 3,245,476 A | | 4/1966 | Rodwick |
| 3,904,301 A | | 9/1975 | Schroeder |
| 3,914,067 A | | 10/1975 | Leto |
| 4,101,070 A | | 7/1978 | Hoare et al. |
| 4,477,228 A | | 10/1984 | Duffy et al. |
| 4,611,972 A | | 9/1986 | Andrae |
| 4,863,353 A | | 9/1989 | Manninen |
| 5,593,265 A | | 1/1997 | Kizer |
| 5,593,283 A | | 1/1997 | Scott |
| 6,918,723 B2 | | 7/2005 | Battig et al. |
| 7,086,843 B2 | | 8/2006 | Cheng |
| 9,057,273 B2 | | 6/2015 | Wang et al. |
| 2012/0056041 A1 | | 3/2012 | Rhee et al. |
| 2013/0129545 A1 | | 5/2013 | Kadono et al. |
| 2013/0287577 A1 | | 10/2013 | Lin et al. |
| 2014/0314577 A1 | * | 10/2014 | Udall ....................... B64C 11/04 416/220 R |
| 2014/0356174 A1 | | 12/2014 | Wang et al. |
| 2015/0275921 A1 | * | 10/2015 | Pinkney ................. F01D 5/025 416/204 R |

FOREIGN PATENT DOCUMENTS

| | | |
|---|---|---|
| CN | 203306224 U | 11/2013 |
| DE | 10012322 A1 | 9/2000 |
| DE | 202013101170 U1 | 3/2013 |
| EP | 2535519 A2 | 12/2012 |

OTHER PUBLICATIONS

International search report and written opinion dated May 20, 2014 for PCT/CN2014/070333.
Notice of allowance dated Apr. 13, 2015 for U.S. Appl. No. 14/167,735.
Office action dated May 12, 2014 for U.S. Appl. No. 14/167,735.
Office action dated Dec. 4, 2014 for U.S. Appl. No. 14/167,735.

* cited by examiner

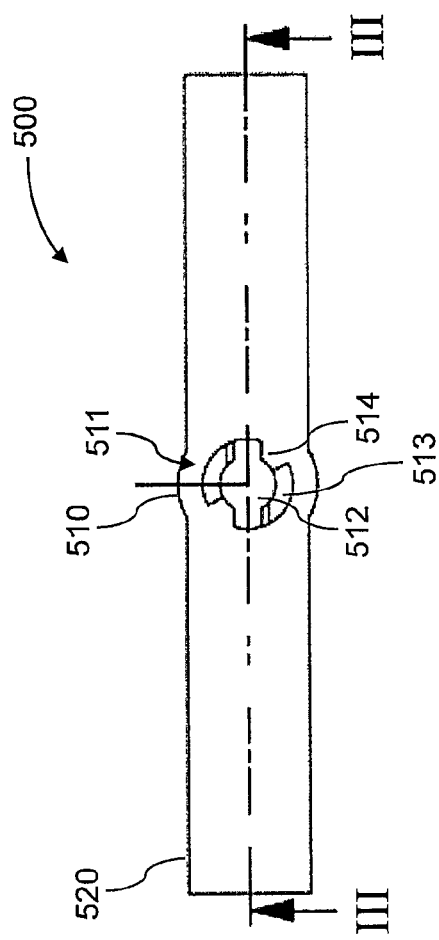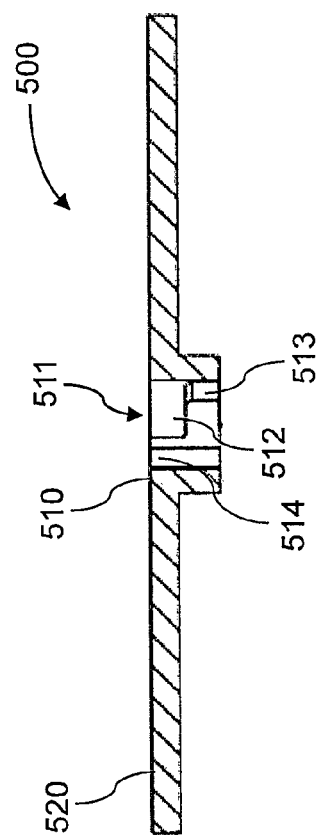
FIG. 7A
FIG. 7B

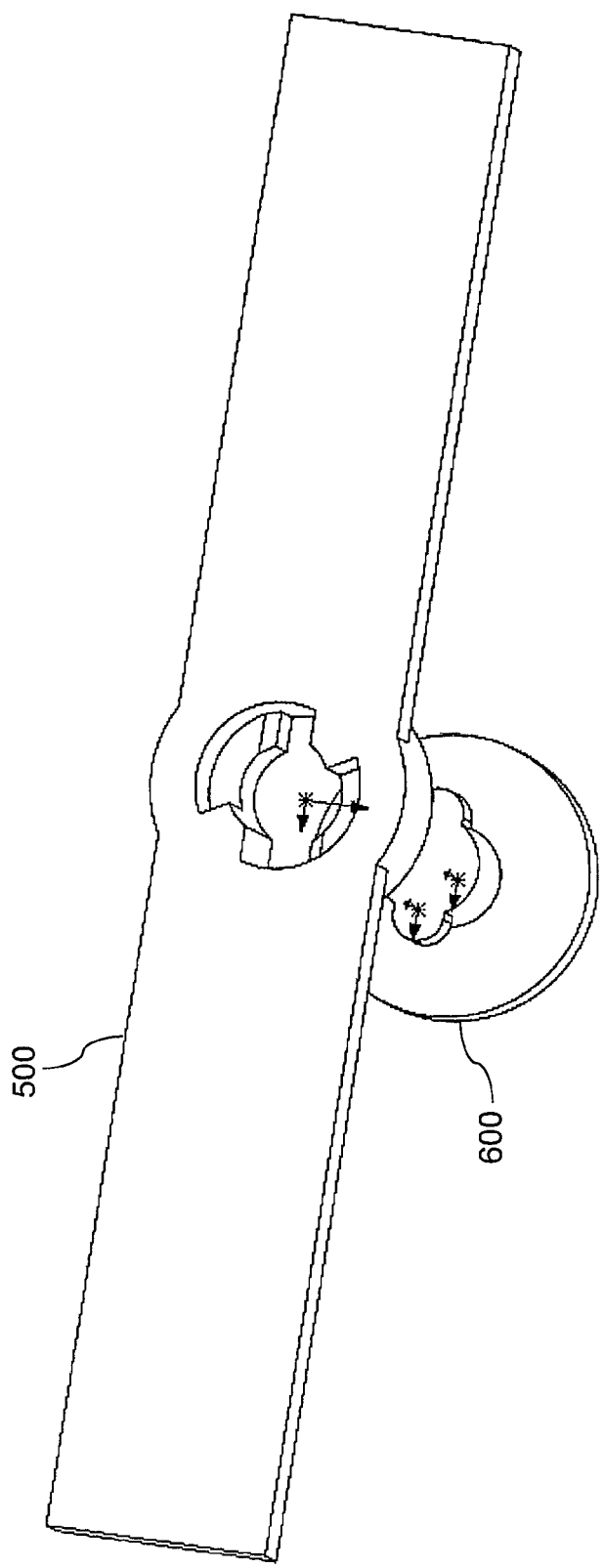

SELF-TIGHTENING ROTOR

CROSS-REFERENCE

This application is a continuation application of Ser. No. 14/167,735, filed Jan. 29, 2014, which is a continuation application of International Application No. PCT/CN2014/070333, filed Jan. 8, 2014, which claims the benefit of Chinese Application No. 201320311523.9, filed May 31, 2013, which these applications are hereby incorporated by reference in their entirety.

BACKGROUND

Unmanned vehicles such as unmanned aerial vehicles can be used for performing surveillance, reconnaissance, and exploration tasks for military and civilian applications. Such unmanned vehicles typically include a propulsion system for remote controlled and/or autonomous movement with the surrounding environment. For example, an unmanned aerial vehicle may be propelled by one or more rotors enabling vertical take-off and landing, flight, and hovering.

Existing rotor designs for unmanned aerial vehicles, however, can be less than ideal. Typically, rotors are fastened to the drive shaft using fasteners such as screws, nuts, and pins. In some instances, however, such fasteners can loosen when subjected to vibration and other fretting motions, thereby causing loosening of the rotor and compromising the function and safety of the vehicle.

SUMMARY

A need exists for improved rotors for movable objects such as unmanned aerial vehicles. The present invention provides systems, methods, and devices for propulsion of self-propelled movable objects. Such propulsion may occur with the aid of one or more rotors. In some embodiments, the systems, methods, and devices described herein provide an improved rotor incorporating fastening features that are self-tightened by the operation of the rotor (e.g., rotation). The self-tightening fastening features disclosed herein improve resistance of the rotor to accidental loosening, thereby enhancing durability and safety. Furthermore, the fastening features of the present invention enable the rotor to be mounted onto a drive shaft without additional fastening elements, thereby simplifying the rotor design.

In one aspect of the present disclosure, a rotor assembly for a self-propelled movable object is described. The rotor assembly includes: a hub including a first fastening feature; a drive shaft including a second fastening feature and directly coupled to the hub by a mating connection of the first and second fastening features, wherein the drive shaft is configured to cause rotation of the hub such that the mating connection of the first and second fastening features is tightened by the rotation; and a plurality of rotor blades coupled to the hub and configured to rotate therewith to generate a propulsive force.

In another aspect of the present disclosure, a rotor assembly for a self-propelled movable object is described. The rotor assembly includes: a hub; an adapter coupled to the hub and including a first fastening feature; a drive shaft including a second fastening feature and coupled to the hub through the adapter by a mating connection of the first and second fastening features, wherein the drive shaft is configured to cause rotation of the hub such that the mating connection of the first and second fastening features is tightened by the rotation; and a plurality of rotor blades coupled to the hub and configured to rotate therewith to generate a propulsive force.

In some embodiments, the self-propelled movable object is an unmanned aerial vehicle.

In some embodiments, the first and second fastening features include mating screw threads. The screw threads can be right-handed screw threads and the hub can rotate counterclockwise. The screw threads can be left-handed screw threads and the hub can rotate clockwise. The first fastening feature can include male screw threads and the second fastening feature can include female screw threads. The first fastening feature can include female screw threads and the second fastening feature can include male screw threads.

In some embodiments, the first and second fastening features include mating locking features configured to lock the hub at a specified position and/or orientation relative to the drive shaft. The first fastening feature can include an aperture in the hub and the second fastening feature can include a protrusion of the drive shaft insertable into the aperture.

In some embodiments, the plurality of rotor blades are integrally formed with the hub.

In some embodiments, the plurality of rotor blades are releasably coupled to the hub.

In some embodiments, the drive unit includes a motor that rotates, thereby driving the drive shaft.

In some embodiments, the first fastening feature is integrally formed with the hub.

In some embodiments, the first fastening feature is disposed within a cavity of the hub.

In some embodiments, the first fastening feature is disposed on a protrusion of the hub.

In some embodiments, the adapter is formed from a material having greater durability than a material of the hub.

In some embodiments, the first fastening feature is integrally formed with the adapter.

In some embodiments, the adapter is coupled to a cavity of the hub.

In some embodiments, the adapter is coupled to a protrusion of the hub.

In some embodiments, the adapter is fixedly coupled to the hub.

In some embodiments, the adapter is releasably coupled to the hub.

In another aspect of the present disclosure, a self-propelled movable object is described. The self-propelled movable object includes: a body; one of the aforementioned rotor assemblies coupled to the body; and a drive unit coupled to the body and configured to drive the drive shaft to cause the rotation of the hub.

In another aspect of the present disclosure, a method for propelling a self-propelled movable object is described. The method includes: providing the aforementioned self-propelled movable object; driving, by means of the drive unit, the drive shaft, thereby causing the rotation of the hub; and effecting a movement of the self-propelled movable object by the propulsive force generated by the plurality of rotor blades.

In another aspect of the present disclosure, a self-propelled movable object is provided. The self-propelled movable object includes: a body including a support element; at least one propulsion unit coupled to the support element and configured to a generate a propulsive force when rotated; and an actuator coupled to the body and configured to cause a rotation of the at least one propulsion unit, wherein the rotation of the at least one propulsion unit causes the at least one propulsion unit to be more tightly coupled to the support element.

In some embodiments, the self-propelled movable object is an unmanned aerial vehicle.

In some embodiments, the support element is a drive shaft operably coupled to the actuator.

In some embodiments, the at least one propulsion unit includes a rotor having a plurality of rotor blades. The rotor can be a vertically oriented rotor. The rotor can be a horizontally oriented rotor.

In some embodiments, the at least one propulsion unit is coupled to the support element by mating screw threads. The screw threads can be right-handed screw threads and the at least one propulsion unit can rotate counterclockwise. The screw threads can be left-handed screw threads and the at least one propulsion unit can rotate clockwise.

In some embodiments, the at least one propulsion unit is coupled to the support element by mating locking features configured to lock the at least one propulsion unit at a specified position and/or orientation relative to the drive shaft.

In some embodiments, the actuator includes a motor that rotates, thereby effecting the rotation of the at least one propulsion unit.

In another aspect of the present disclosure, a method for propelling a self-propelled movable object is provided. The method includes: providing the aforementioned self-propelled movable object; driving the actuator to cause the rotation of the at least one propulsion unit; and effecting a movement of the self-propelled movable object by the propulsive force generated by the at least one propulsion unit.

It shall be understood that different aspects of the invention can be appreciated individually, collectively, or in combination with each other. Various aspects of the invention described herein may be applied to any of the particular applications set forth below or for any other types of movable objects. Any description herein of an aerial vehicle may apply to and be used for any movable object, such as any vehicle. Additionally, the systems, devices, and methods disclosed herein in the context of aerial motion (e.g., flight) may also be applied in the context of other types of motion, such as movement on the ground or on water, underwater motion, or motion in space. Furthermore, any description herein of a rotor or rotor assembly may apply to and be used for any propulsion system, device, or mechanism configured to generate a propulsive force by rotation (e.g., propellers, wheels, axles).

Other objects and features of the present invention will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 7A illustrates yet another example of a rotor for a movable object, in accordance with embodiments;

FIG. 7B is a cross-section of the rotor of FIG. 7A along line III-III;

FIG. 9 illustrates the rotor of FIG. 7A prior to mounting on the drive shaft of FIG. 8A;

DETAILED DESCRIPTION

Figure 1:
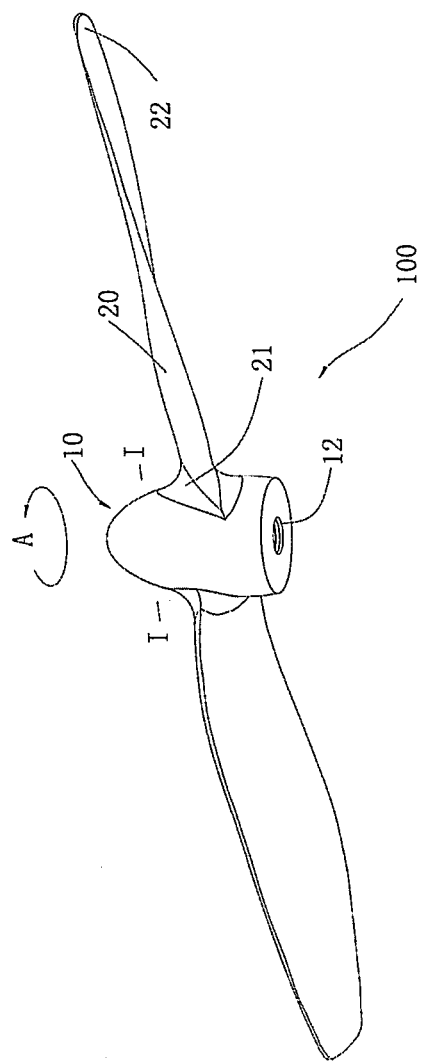
FIG. 1 illustrates a rotor for propelling a movable object, in accordance with embodiments.

The system, devices, and method of the present invention provide improved rotors for movable objects, such as a self-propelled movable object (e.g., an unmanned aerial vehicle (UAV)). In some embodiments, the rotors and rotor assemblies described herein incorporate fastening features that are configured to self-tighten during rotor operation in order to prevent inadvertent loosening of the rotor. Advantageously, the disclosed self-tightening features enhance the safety, stability, and durability of rotor assemblies for self-propelled movable objects.

For example, an unmanned rotorcraft may be propelled through the air by propulsive forces generated by the rotation of a rotor. The rotor can be mounted to the rotorcraft via a drive shaft operable to rotate the rotor. To ensure that the rotor remains secured even when subjected to vibrations and other motions that may cause loosening, the rotor can be coupled to the drive shaft by integrally formed screw threads having a directionality configured to self-tighten with the rotation of the rotor. The use of integrated screw threads can also simplify assembly of the rotorcraft by reducing the overall number of parts.

Thus, in one aspect, the present invention provides a rotor assembly for a self-propelled movable object having one or more of the following unique features. In a first embodiment, a rotor assembly comprises: a hub comprising a first fastening feature; a drive shaft comprising a second fastening feature and directly coupled to the hub by a mating connection of the first and second fastening features, wherein the drive shaft is configured to cause rotation of the hub such that the mating connection of the first and second fastening features is tightened by the rotation; and a plurality of rotor blades coupled to the hub and configured to rotate therewith to generate a propulsive force.

A rotor of the present invention can include a plurality of rotor blades coupled to a central hub. A rotor assembly can include a rotor and a drive shaft configured to drive the rotation of the rotor. The hub of the rotor and the drive shaft can each include a respective fastening feature, with the fastening features being complementary to each other such that a mating connection can be formed to couple the hub to the drive shaft. The mating connection can be configured to be tightened by the rotation of the hub and rotor blades, thereby preventing the rotor from becoming loosened from the drive shaft during operation. This approach advantageously improves rotor safety and stability without requiring additional parts.

In a second embodiment, the present invention provides an alternative rotor assembly for a self-propelled movable object. The rotor assembly comprises: a hub; an adapter coupled to the hub and comprising a first fastening feature; a drive shaft comprising a second fastening feature and coupled to the hub through the adapter by a mating connection of the first and second fastening features, wherein the drive shaft is configured to cause rotation of the hub such that the mating connection of the first and second fastening features is tightened by the rotation; and a plurality of rotor blades coupled to the hub and configured to rotate therewith to generate a propulsive force.

The hub, rotor blades, and drive shaft described above are equally applicable to this embodiment. Where desired, the hub can be modified to couple an adapter having a fastening feature. Accordingly, the hub can be coupled to the drive shaft by a mating connection between the fastening features of the adapter and the drive shaft. The mating connection can be a self-tightening connection as previously described. Advantageously, the adapter can be formed from a more durable material than the hub, thus improving the wear resistance of the mating connection and thus extending the overall lifespan of the rotor assembly.

In a separate aspect, the present invention provides a self-propelled movable object having one or more of the following unique features. In one embodiment, a self-propelled movable object comprises: a body; the rotor assembly of the first or second embodiment coupled to the body; and a drive unit coupled to the body and configured to drive the drive shaft to cause the rotation of the hub.

The hub, rotor blades, adapter, and drive shaft described above with regards to the rotor assemblies of the first and second embodiments are equally applicable to this embodiment. The movable object can also include a drive unit suitable for actuating the drive shaft to rotate the rotor. Accordingly, the rotor assembly can be mounted to the body of the movable object to provide propulsive forces for effecting a movement of the movable object (e.g., effecting translational and/or rotational movements).

In another embodiment, the present invention provides another alternative self-propelled movable object. The self-propelled movable object comprises: a body comprising a support element; at least one propulsion unit coupled to the support element and configured to generate a propulsive force when rotated; and an actuator coupled to the body and configured to cause a rotation of the at least one propulsion unit, wherein the rotation of the at least one propulsion unit causes the at least one propulsion unit to be more tightly coupled to the support element.

The propulsion unit can be a rotor, rotor assembly, or any other rotating propulsion device (e.g., a propeller, wheel, axle), and any description herein pertaining to a rotor or rotor assembly can also be applied to any suitable rotary propulsion unit. The propulsion unit can be mounted to the body of the movable object through a support element, which can be a shaft (e.g., a drive shaft as described herein), frame, strut, or any other element suitable for coupling and supporting the propulsion unit on the movable object. The actuator, which may encompass a drive unit and/or drive transmission elements, can cause the rotation of the propulsion unit to propel the movable object. The rotation of the propulsion unit may cause self-tightening of the coupling between the propulsion unit and the support element, similar to the self-tightening mating connection described above.

In a separate aspect, the present invention provides a method for propelling a self-propelled movable object having one or more of the following steps. In one embodiment, a method comprises: providing the aforementioned self-propelled movable object comprising a body, the rotor assembly of the first or second embodiment, and a drive unit; driving, by means of the drive unit, the drive shaft, thereby causing the rotation of the hub; and effecting a movement of the self-propelled movable object by the propulsive forces generated by the plurality of rotor blades.

As previously described herein, the self-propelled movable object can include a body, a rotor assembly mounted on the body, and a drive unit. To propel the movable object, the drive unit can be used to drive the drive shaft to cause the hub of the rotor to rotate, thereby rotating the rotor blades. In some instances, the drive shaft may actuate the rotation of the hub via a coupled adapter, as described above. The propulsive forces generated by the rotation of the rotor blades can effect a movement of the movable object.

In another embodiment, the present invention provides another alternative method for propelling a self-propelled movable object having one or more of the following steps. The method comprises providing a self-propelled movable object, the self-propelled movable object comprising: a body comprising a supporting element; at least one propulsion unit coupled to the support element and configured to generate a propulsive force when rotated; and an actuator coupled to the body and configured to cause a rotation of the at least one propulsion unit, wherein the rotation of the at least one propulsion unit causes the at least one propulsion unit to be more tightly coupled to the support element. The method also comprises: driving the actuator to cause the rotation of the at least one propulsion unit; and effecting a movement of the self-propelled movable object by the propulsive force generated by the at least one propulsion unit.

The self-propelled movable object having a propulsion unit, support element, and actuator disclosed above are equally applicable to this embodiment. Similar to the other embodiments described herein, the actuator can be driven to cause the propulsion unit to rotate, thereby propelling the movable object by the resultant propulsive force generated by the rotation of the propulsion unit. The propulsion unit may include a rotor.

A rotor of the present invention can include any suitable number of rotor blades (e.g., one, two, three, four, or more blades). A rotor blade can be of any suitable shape, such as a flat shape, a curved shape, a twisted shape, a tapered shape, or suitable combinations thereof. The rotor blade may be a substantially elongated shape. In some embodiments, the shape of the blade can be varied (e.g., by telescoping, folding, bending, and the like). The blade may be symmetrical (which may refer to having identical upper and lower surfaces) or asymmetrical (which may refer to having differently shaped upper and lower surfaces). For example, the blade can be shaped into an airfoil, wing, or other geometry suitable for generating aerodynamic forces (e.g., lift forces, thrust forces) when the blade is moved through the air. The geometry of the blade can be selected in order to optimize the aerodynamic properties of the blade, such as to increase lift and thrust forces and reduce drag forces.

The blade can have any suitable dimensions, such as length, width, chord length, and thickness. For example, the length of the blade can be less than or equal to 1 cm, 2 cm, 3 cm, 4 cm, 5 cm, 6 cm, 7 cm, 8 cm, 9 cm, 10 cm, 12 cm, 15 cm, 20 cm, 25 cm, 50 cm, 1 m, 2 m, 5 m, or 10 m. Conversely, the length of the blade can be greater than or equal to 0.5 cm, 1 cm, 2 cm, 3 cm, 4 cm, 5 cm, 6 cm, 7 cm, 8 cm, 9 cm, 10 cm, 25 cm, 50 cm, 1 m, 2 m, or 5 m. The width or chord length of the blade can be less than or equal to 0.5 cm, 1 cm, 2 cm, 3 cm, 4 cm, 5 cm, 6 cm, 7 cm, 8 cm, 9 cm, 10 cm, 25 cm, or 50 cm. Conversely, the width or chord length of the blade can be greater than or equal to 0.5 cm, 1 cm, 2 cm, 3 cm, 4 cm, 5 cm, 6 cm, 7 cm, 8 cm, 9 cm, 10 cm, 25 cm, or 50 cm. The thickness of the blade can be less than or equal to 0.01 cm, 0.05 cm, 0.1 cm, 0.5 cm, cm, 2 cm, 3 cm, 4 cm, 5 cm, 6 cm, 7 cm, 8 cm, 9 cm, or 10 cm. Conversely, the thickness of the blade can be greater than or equal to 0.01 cm, 0.05 cm, 0.1 cm, 0.5 cm, cm, 2 cm, 3 cm, 4 cm, 5 cm, 6 cm, 7 cm, 8 cm, 9 cm, or 10 cm. The length of the blade can be greater than the width of the blade and the thickness of the blade. The width of the blade can be greater than the thickness of the blade. In some instances, a ratio of the length to the width can be greater than or equal to: 2:1, 3:1, 4:1, 5:1, 6:1, 7:1, 8:1, 9:1, 10:1, 12:1, 15:1, or 20:1.

The blades can be coupled to a central hub. The coupling may be a fixed coupling, such that the position and/or orientation of the blades are fixed relative to the hub. In some instances, the blades can be integrally formed with the hub. The blades and the hub can be formed of a single integral piece. Alternatively, the blades can be movable relative to the hub with up to three degrees of freedom in translation and up to three degrees of freedom in rotation, such as by means of suitable joints, hinges, bearings, fasteners, and other coupling elements. The blades can be permanently coupled to the hub. Conversely, the blades can be releasably coupled to the hub. The blades can be disposed symmetrically or asymmetrically about the hub. In some embodiments, the blades can be arranged radially around the hub, such that a proximal portion of each blade is coupled to the hub and a distal portion of each blade extends radially outward from the hub. The blades can be equally spaced apart along a radial direction. For example, two blades can be separated by 180°, three blades can be separated by 120°, four blades can be separated by 90°, and so on.

The hub can be coupled to a support element suitable for supporting the rotor during operation while enabling rotation of the hub and rotor blades. The coupling can be a permanent coupling or a releasable coupling. The hub can be pivotally coupled to the support element such that the angle of the rotor can be tilted between a plurality of different angles. Alternatively, the hub can be fixedly coupled at a set angle relative to the support element. The support element may be a shaft, frame, strut, brace, or other component of the movable object. A drive shaft may be an example of a support element. In some embodiments, the support element may be translated and/or rotated relative to the movable object, while in other embodiments, the support element may be in a fixed position and/or orientation relative to the movable object. Optionally, the support element may be an actuator or a component of an actuator for the rotor. For example, the hub can be coupled to a drive shaft configured to actuate the rotation of the hub, which may produce a corresponding rotation of the coupled blades. It shall be understood that any description herein of coupling to a drive shaft can also be applied to coupling to other types of support elements.

The hub can be coupled to the drive shaft using any suitable means, such as with fasteners (e.g., screws, nuts, bolts, pins, rivets), interference fits, snap fits, adhesives, welding, and the like. In some embodiments, the hub can be coupled to drive shaft using a mating connection between one or more fastening features of the hub and the drive shaft. For example, the hub can include a first fastening feature and the drive shaft can include a second fastening feature complementary to and forming a mating connection with the first fastening feature. Suitable fastening features can include one or more of: threads, apertures, passages, slots, tabs, teeth, hooks, snap fits, interlocks, protrusions, indentations, splines, grooves, flanges, ribs, and the like. The fastening feature can include a specific shape or geometry of the hub or drive shaft, such as a two- or three-dimensional shape of an aperture, cross-section, profile, surface, or any other suitable portion of the hub or drive shaft. In some embodiments, the mating connection of the first and second fastening features can be an interference fit or any other coupling maintained primarily by friction between the surfaces of the features. Where desired, the hub may be coupled to the drive shaft only through the use of fastening features and without requiring other coupling means. Alternatively, the hub may be coupled to the drive unit using fastening features in conjunction with other coupling means.

In some embodiments, the hub can be directly coupled to the drive shaft through fastening features as described herein. Alternatively, the hub can be indirectly coupled to the drive shaft through an adapter or other connecting element coupled to the hub. The first fastening feature can be situated on the adapter instead of the hub, such that a mating connection is formed between the fastening features of the drive shaft and adapter. Suitable adapters can include, for example, rings, tubes, inserts, protrusions, connectors, and the like. The fastening feature can be integrally formed with the adapter (e.g., the adapter and fastening feature or formed from a single integral piece.) The hub can be configured to accommodate many different types of adapters. Conversely, the hub can be configured to accommodate only a single type of adapter. The adapter may be a standardized part useable with many different types of rotors. Optionally, the adapter may be specifically configured for a single type of rotor. The adapter can be fixedly coupled to the hub. Alternatively, the coupling may permit the adapter to translate (e.g., with up to three degrees of freedom) and/or rotate (e.g., with up to three degrees of freedom) relative to the hub. The adapter can be permanently affixed to the hub. Conversely, the adapter can be releasably coupled to the hub. For example, the adapter may be configured to be easily replaced or substituted so that the rotor can be used with a plurality of different types of adapters. In some instances, the adapter can be exchanged or swapped with other adapters having different types of fastening features, such that a single rotor can be coupled with many different types of drive shafts having different types of fastening features.

When desired, a drive shaft coupled to a rotor can be driven (e.g., rotated) by a suitable actuator or drive unit to cause the rotation of the hub and rotor blades. For example, the drive unit can include a motor or engine, such as a rotating motor. The blades can be driven by the drive shaft to spin about an axis of rotation (e.g., the longitudinal axis of the drive shaft) in a clockwise direction and/or a counterclockwise direction. The blades can all spin in the same direction. Alternatively, one or more blades of a rotor can be configured to spin independently, such that some of the blades spin in one direction and other blades spin in the opposite direction. In some embodiments, the blades may all spin at the same rate, while in other embodiments, some of the blades may spin at different rates. The blades may all spin in the same plane of rotation. Alternatively, some of the blades may spin in different planes of rotation, and the different planes may be parallel planes. The rotor can be a horizontal rotor (which may refer to a rotor having a horizontal plane of rotation), a vertically oriented rotor (which may refer to a rotor having a vertical plane of rotation), or a rotor tilted at an intermediate angle between the horizontal and vertical positions. In some embodiments, horizontally oriented rotors may spin and provide lift to the movable object. Vertically oriented rotors may spin and provide thrust to the movable object. Rotors oriented an intermediate angle between the horizontal and vertical positions may spin and provide both lift and thrust to the movable object. One or more rotors may be used to provide a torque counteracting a torque produced by the spinning of another rotor. The forces generated by the rotation of the rotors can be of a sufficient magnitude to propel the movable object. In some embodiments, the rotors can be configured to spin at a rate suitable for generating the desired propulsive forces. The rotation rate can be based on the dimensions of the movable object (e.g., size, weight), and the movable object may have any suitable dimensions as described elsewhere herein.

In some instances, the rotation of the rotor can cause the coupling of the hub to the drive shaft to become loosened. For example, fretting-induced motion (e.g., vibration) of the hub and drive shaft during rotor operation can loosen the mating connection of the fastening features. Accordingly, in order to counteract and/or prevent such loosening, the fastening features can be configured to self-tighten during rotor operation. Tightening of a mating connection may involve one or both of the fastening features moving relative to each other. Conversely, tightening may refer to maintaining a current disposition of the fastening features relative to each other without involving any relative movements. Tightening of the fastening feature may prevent or constrain the movement of the rotor relative to the drive shaft. Tightening may refer to preventing or constraining macroscopic movements of the rotor relative to the driver shaft while allowing microscopic movements. The tightening may prevent or constrain movement in one or more directions. For example, tightening may prevent or constrain the rotor from translating along the longitudinal axis of the drive shaft (e.g., up or down the drive shaft). Tightening may prevent or constrain the rotor from translating along the lateral axis of the drive shaft (e.g., forward, backward, left, or right). In some instances, tightening may prevent or constrain the rotor from rotating relative to the hub, such as preventing rotation of the rotor along directions that do not provide the desired propulsive forces. Optionally, the fastening features can include mating locking features configured to constrain or lock the hub and blades at a specified position and/or orientation relative to the drive shaft. The descriptions of fastening features provided herein can also be applied to locking features. Self-tightening, which may also be used to refer to self-locking or self-fastening, may refer to a tightening of the mating connection between the fastening features that occurs without specifically applying a force to produce the tightening. The self-tightening can be an automatic process that occurs without any external intervention (e.g., from a user).

In some embodiments, forces exerted on the mating connection during rotor operation may incidentally serve to tighten the mating connection. The mating connection may also be tightened by forces exerted when the rotor is not operating (e.g., not rotating). Such forces may include forces due to inertia, friction, gravity, lift, thrust, drag, air resistance, torque, and the like. The self-tightening force may have a directionality (e.g., right-handed, left-handed, clockwise, counterclockwise). For example, the mating connection may be tightened only by a force or torque applied in certain directions. In some embodiments, self-tightening forces can be generated by rotation of the rotor, such as a clockwise rotation and/or a counterclockwise rotation, and the rotor may be configured to rotate only in the direction(s) causing self-tightening of the mating connection. The tightening direction may be a different direction than the rotation direction of the rotor, such as the opposite of the rotation direction. Conversely, the tightening direction may be the same as the rotation direction.

The elements of the exemplary rotors and rotor assemblies described herein (e.g., blades, hub, adapter, drive shaft) may be flexible elements or rigid elements, and can be fabricated using any suitable material or combination of materials. Suitable materials can include metals (e.g., stainless steel, aluminum), plastics (e.g., polystyrene, polypropylene), wood, composite materials (e.g., carbon fiber), and the like. The materials for the rotors and rotor assemblies can be selected based on one or more of strength, weight, durability, stiffness, cost, processing characteristics, and other material properties. In some embodiments, adapters may be fabricated from a material having greater durability than other rotor assembly elements (e.g., the hub, blades) in order to improve the wear resistance and longevity of the fastening features and mating connection surfaces. For example, the hub and blades can be formed from plastic materials, while the adapter can be formed from metallic materials. The couplings described herein can utilize one or more of fasteners (e.g., screws, nuts, bolts, pins, rivets), interference fits, snap fits, adhesives, welding, and the like. When desired, any of the couplings between rotor assembly elements (e.g., blades, hub, adapter, drive shaft, or between components thereof) can utilize the self-tightening fastening features disclosed herein.

Figure 2:
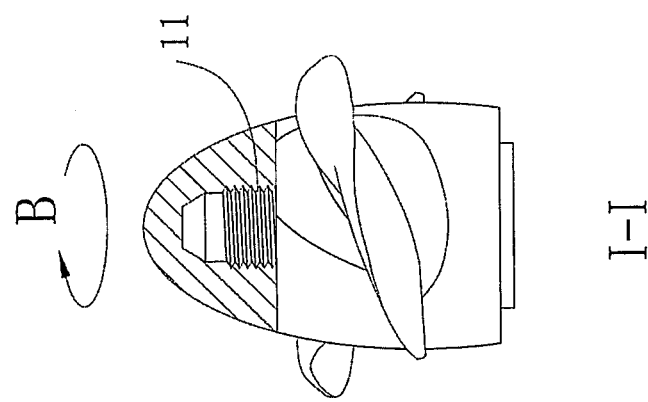
FIG. 2 is a cross-section of the rotor of FIG. 1 along line I-I.

Referring now to the drawings, FIGS. 1 and 2 illustrate a rotor 100 for a movable object, in accordance with embodiments. The rotor 100 includes a hub 10 and a plurality of rotor blades 20. Although the rotor 100 is depicted as having two rotor blades 20, any suitable number of rotor blades can be used (e.g., one, two, three, four, five, or more). Each rotor blade 20 includes a proximal end 21 and a distal end 22. The rotor blades 20 can be coupled to the hub 10 by their respective proximal ends 21, such as by permanent coupling or releasable couplings as previously described herein. In some instances, the rotor blades 20 can be integrally formed with the hub 10. The hub 10 and rotor blades 20 can be driven by a suitable drive shaft (not shown) to rotate in a direction A, which is illustrated as a counterclockwise direction. However, in other embodiments, the hub 10 and rotor blades 20 can be configured for clockwise rotation, or for rotation in both directions.

The hub 10 can include a fastening feature 11 for coupling the hub to the drive shaft. The fastening feature can be situated on any suitable portion of the hub 10, such as on the exterior, interior, top, bottom, or lateral sides of the hub 10. For example, the fastening feature 11 can be disposed within a cavity 12 of the hub 10, the cavity 12 being shaped to receive an end of a drive shaft. The fastening feature 11 can be integrally formed with the hub 10 such that the hub can be directly coupled to the drive shaft. Alternatively, the hub 10 can be indirectly coupled to the drive shaft, such as by an adapter as previously described herein. For example, the adapter can be configured to be inserted within the cavity 12 of the hub 10. Accordingly, the fastening feature 11 can be disposed on the adapter such that the mating connection is formed between the adapter and the drive shaft, rather than directly between the hub 10 and the drive shaft. The adapter can be formed from having improved durability relative to the hub to improve the lifespan of the fastening feature 11 and mating connection, as described elsewhere herein.

The fastening feature 11 can include female screw threads configured to form a mating connection with a complementary fastening feature on the drive shaft (e.g., male screw threads). Although the fastening feature 11 is depicted in FIGS. 1 and 2 as screw threads, this is not intended to be limiting, and any descriptions herein relating to screw threads can be applied to any suitable type of fastening feature. The fastening feature 11 can have a directionality, such that the mating connection is tightened by rotation in a direction B, which is depicted as a clockwise direction. In some instances, the axes of rotation of the rotation direction A and the tightening direction B may be coaxial. Alternatively, the axes of rotation may not be coaxial.

In some embodiments, the tightening direction B is configured to be opposite the rotation direction A, such that the mating connection formed by the fastening feature 11 self-tightens as the rotor spins. For example, when the rotation direction A is counterclockwise, the tightening direction B can be clockwise (e.g., as with right-handed screw threads), as depicted in FIGS. 1 and 2. Conversely, when the rotation direction A is clockwise, the tightening direction B can be counterclockwise (e.g., as with left-handed screw threads). Furthermore, by configuring the rotation direction A and the tightening direction B to be opposite, the air resistance experienced by the rotor blades 20 during operation can be balanced by the friction experienced by the mating connection of the fastening feature 11, thereby reducing the magnitude of vibrations and other fretting motions experienced by the rotor 100.

Figure 3:
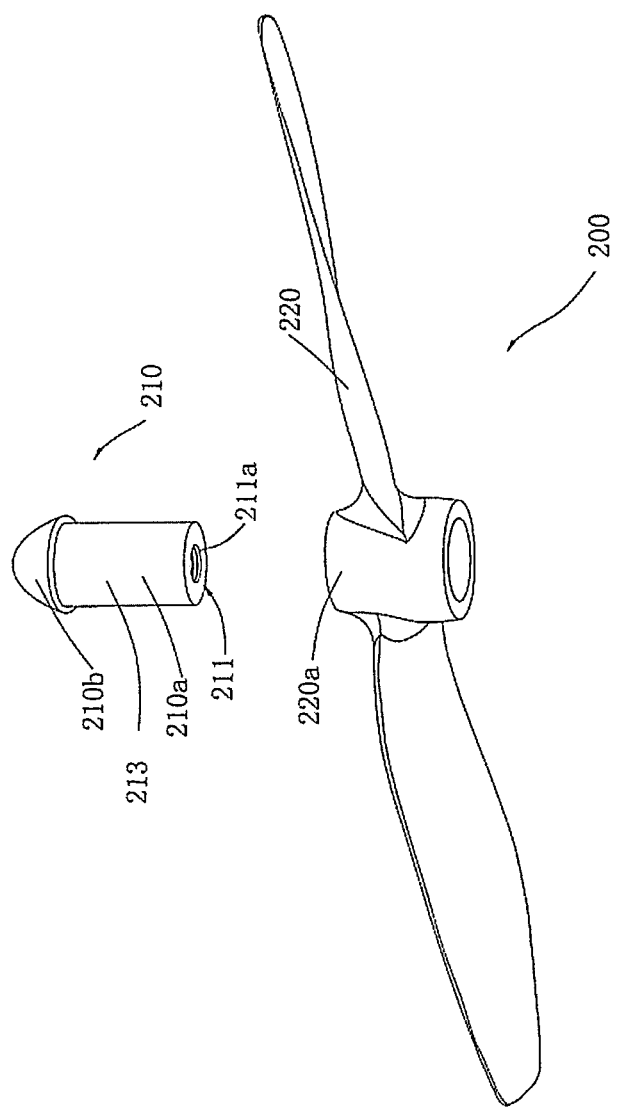
FIG. 3 illustrates another example of a rotor for a movable object, in accordance with embodiments.

FIG. 3 illustrates another example of a rotor 200 for a movable object, in accordance with embodiments. The rotor 200 includes a hub 210 and rotor blades 220. The hub 210 can be configured as an insert 213 with a cylindrical body 210a and a conical cap 210b. The rotor blades 220 can be formed with a cylindrical receptacle 220a having a passage for receiving the insert 213. The rotor blades 220 may be connected to each other via the receptacle 220a. In some instances, the rotor blades 220 may be incorporated into a single integral piece with the receptacle 220a. The rotor blades 220 can be coupled to the hub 210 by inserting the insert 213 into the receptacle 220a. Optionally, the cap 210b of the insert 213 can have a greater maximum cross-sectional area than the body 210a in order to control the depth to which the insert 213 can be inserted into the receptacle 220a. The insert 213 can be permanently affixed or releasably coupled within the receptacle 220a. For example, the insert 213 can be coupled within the receptacle 220a by fasteners, interference fits, snap fits, adhesives, welding, and the like.

The body 210a of the insert 213 can include a fastening feature 211 (e.g., female screw threads) disposed within a cavity 211a, similar to the configuration of the rotor 100. Likewise, the fastening feature 211 can be configured to tighten in a direction opposite the rotation of the rotor 200 to provide self-tightening during rotor operation. Optionally, the fastening feature 211 can be situated on an adapter inserted within the cavity 211a and coupled to the body 210a.

Figure 4:
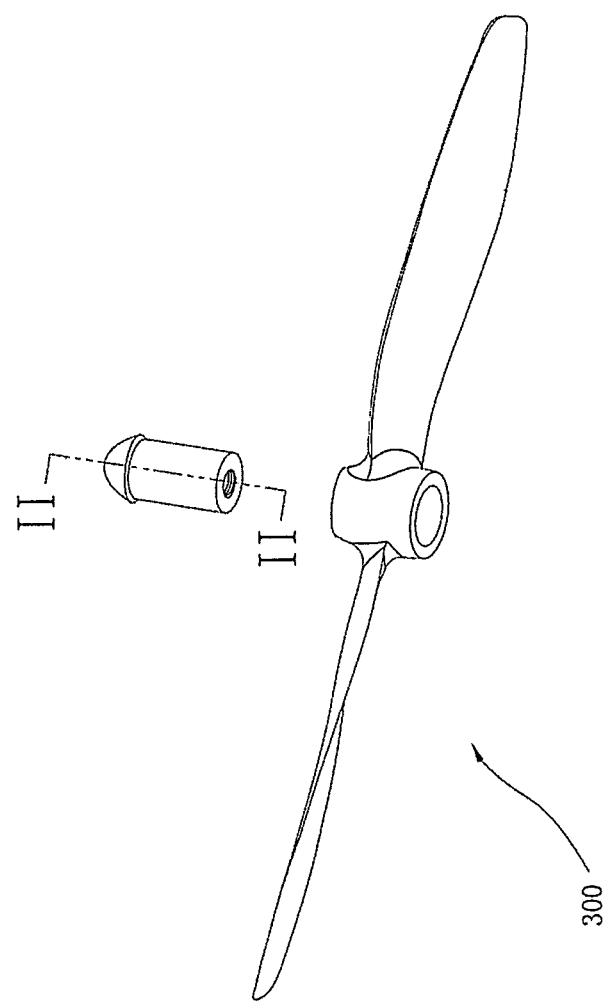
FIG. 4 illustrates an alternative example of a rotor for a movable object, in accordance with embodiments.
Figure 5:
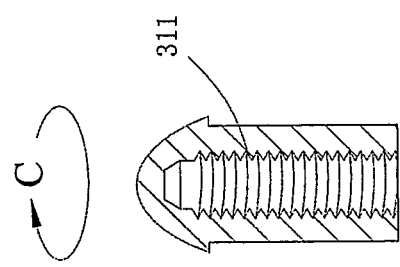
FIG. 5 is a cross-section of the rotor of FIG. 5 along line II-II.

FIGS. 4 and 5 illustrate another example of a rotor 300 for a movable object, in accordance with embodiments. The configuration of the rotor 300 is similar to the configuration of the rotor 200, and any elements of the rotor 300 not specifically described herein can be the same as in the rotor 200 or one or more features or characteristics of the rotor 200 can be applied to the rotor 300. The rotor 300 can be configured to rotate in a clockwise direction. The fastening feature 311 of the rotor 300 can be tightened along a tightening direction C. The tightening direction C can be counterclockwise so that the mating connection formed by the fastening feature 311 is self-tightened by clockwise rotation of the rotor 300. For example, the fastening feature 311 can be left-handed female screw threads configured to couple with complementary left-handed male screw threads of a drive shaft. Alternatively, the rotation direction can be counterclockwise and the tightening direction C can be clockwise.

Figure 6:
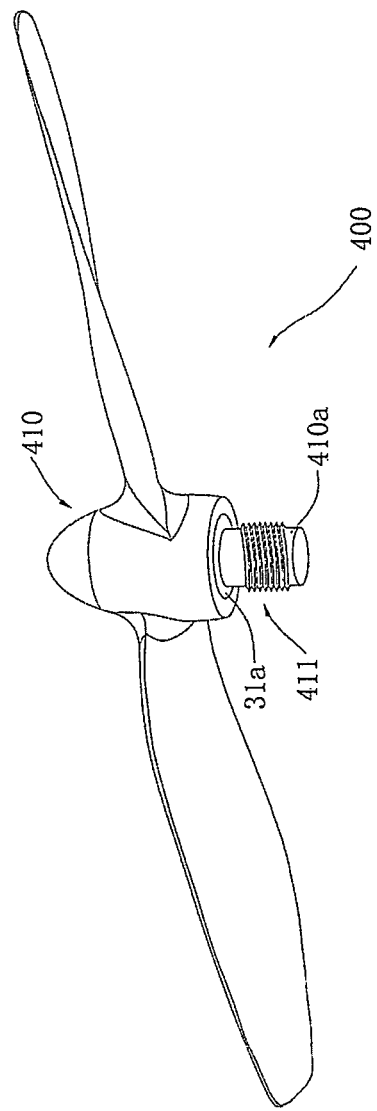
FIG. 6 illustrates another example of a rotor for a movable object, in accordance with embodiments.

FIG. 6 illustrates another example of a rotor 400 for a movable object, in accordance with embodiments. The configuration of the rotor 400 is similar to the configuration of the rotor 100, and any elements of the rotor 400 not specifically described herein can be the same as in the rotor 100 or one or more features or characteristics of the rotor 100 can be applied to the rotor 400. The rotor 400 includes a hub 410, with fastening features 411 situated on a protrusion 410a of the hub 410. The protrusion 410a can be shaped to be inserted into a cavity within a drive shaft (not shown). Accordingly, the fastening feature 411 can be male screw threads configured to mate with complementary female screw threads situated within the cavity of the drive shaft. Optionally, the fastening feature 411 can be situated on an adapter fitted on or over the protrusion 410a and shaped to be inserted within the cavity of the drive shaft. As previously described herein, the tightening direction of the fastening feature 411 can be opposite the rotation direction of the rotor 400 to enable self-tightening during rotor operation.

In some embodiments, the fastening feature 411 can be attached to the hub 410 by means of a connecting element 31a situated on the hub 410. The connecting element 31a may be integrally formed with the hub 410. Conversely, the connecting element 31a may be formed separately from the hub 410. For example, the connecting element 31a may be formed on the bottom surface of the hub 410 and configured to engage the upper surface of the protrusion 410a in order to couple the fastening feature 411 to the hub 410. The connecting element 31a may be coupled to the protrusion 410a using any suitable means, such as fasteners, interference fits, snap fits, adhesives, welding, and the like. The connecting element 31a and the protrusion 410a may be fixedly coupled to each other. Alternatively, the connecting element 31a may be releasably coupled to the protrusion 410a.

FIGS. 7A and 7B illustrate a rotor 500 for a movable object, in accordance with embodiments. The rotor 500 includes a hub 510 and blades 520. The blades 520 can be integrally formed with the hub 510. The hub 510 can include a fastening feature 511 for coupling the rotor to a drive shaft. The fastening feature 511 can be self-tightening, such that rotation of the rotor 500 tightens the mating connection of the fastening feature 511 with the drive shaft as described herein. In some embodiments, the fastening feature 511 can be a locking feature configured to lock the hub 510 at a specified position and/or orientation relative to the drive shaft. For example, the fastening feature 511 can include an aperture 512, a pair of guides 513, and a pair of stops 514 configured for locking the rotor 500 to a drive shaft, as described in further detail below. The aperture 512 can provide a passage through the center of the hub 510. The guides 513 can be curved ramps disposed within the passage and reducing the circumference of a portion of the aperture 512. The guides 513 can partially span the circumference of the aperture 512, such that each guide is terminated at on end by a gap 515 and at the other by a stop 514. The stops 514 can be protrusions extending into the aperture 512 towards the axis of rotation of the rotor 500. The stops 514 can have a greater thickness than the guides 513, such that the upper surfaces of the stops 514 are flush with the upper surface of the rotor 500, while the upper surfaces of the guides 513 are offset from the upper surface of the rotor 500. Upper surface may refer to the surfaces visible in the depiction of FIG. 7A.

Figure 8A:
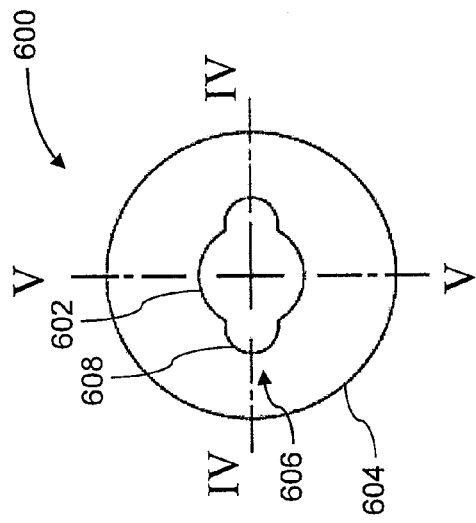
FIG. 8A is a top view of a portion of a drive shaft for a rotor assembly, in accordance with embodiments.
Figure 8C:
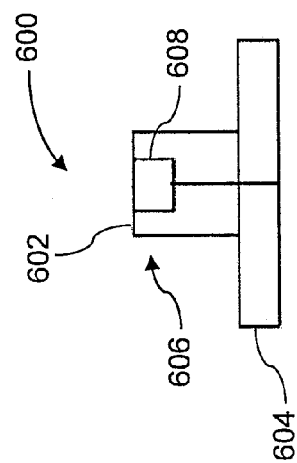
FIG. 8C is a cross-section of the drive shaft of FIG. 8A along line V-V.
Figure 8B:
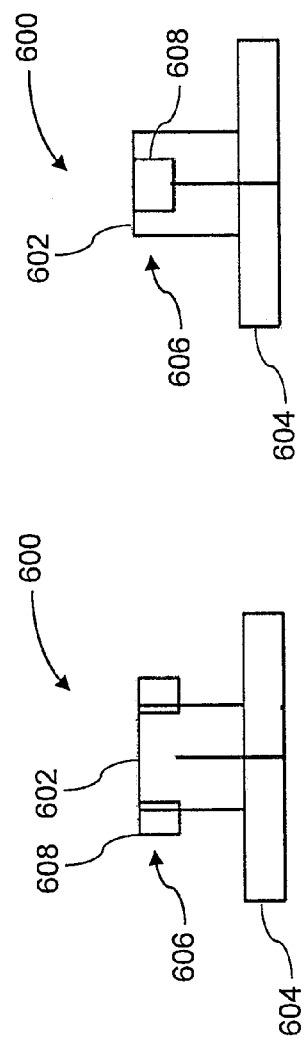
FIG. 8B is a cross-section of the drive shaft of FIG. 8A along line IV-IV.

FIGS. 8A, 8B, and 8C illustrate a portion of a drive shaft 600 of a rotor, in accordance with embodiments. The drive shaft 600 can include a shaft body 602, a base 604, and a fastening feature 606. The fastening feature 606 can be configured to form a mating connection with complementary fastening features of a rotor. Optionally, the fastening feature 606 can be a self-tightening fastening feature as described herein. In some embodiments, the fastening feature 606 can be a locking feature configured to lock a rotor at a specified position and/or orientation relative to the drive shaft 600. For example, the fastening features can include a pair of protrusions 608 shaped to mount and lock the hub 510 of the rotor 500 by engaging the aperture 512, guides 513, and stops 514, as described below. The protrusions 608 can be rounded structures extending outward from the shaft body 602 at a suitable height above the base 604. The protrusions 608 can be disposed symmetrically about the axis of rotation of the drive shaft 600 and be shaped to fit within the gaps 515 of the rotor 500.

Figure 10:
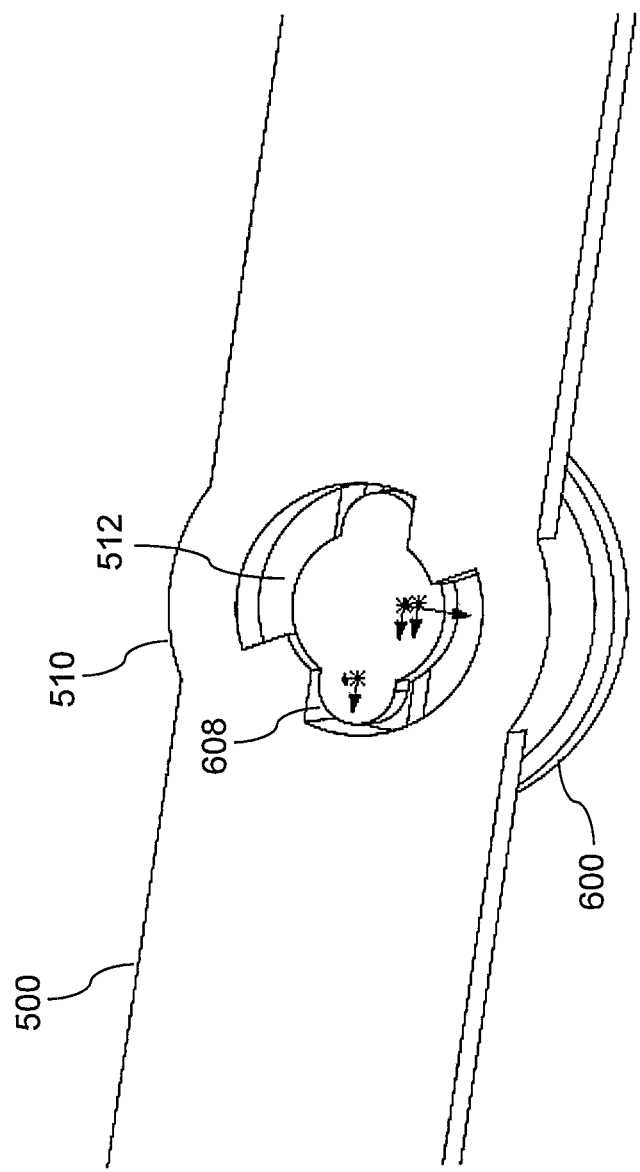
FIG. 10 illustrates the drive shaft of FIG. 8A inserted into the rotor of FIG. 7A.
Figure 11:
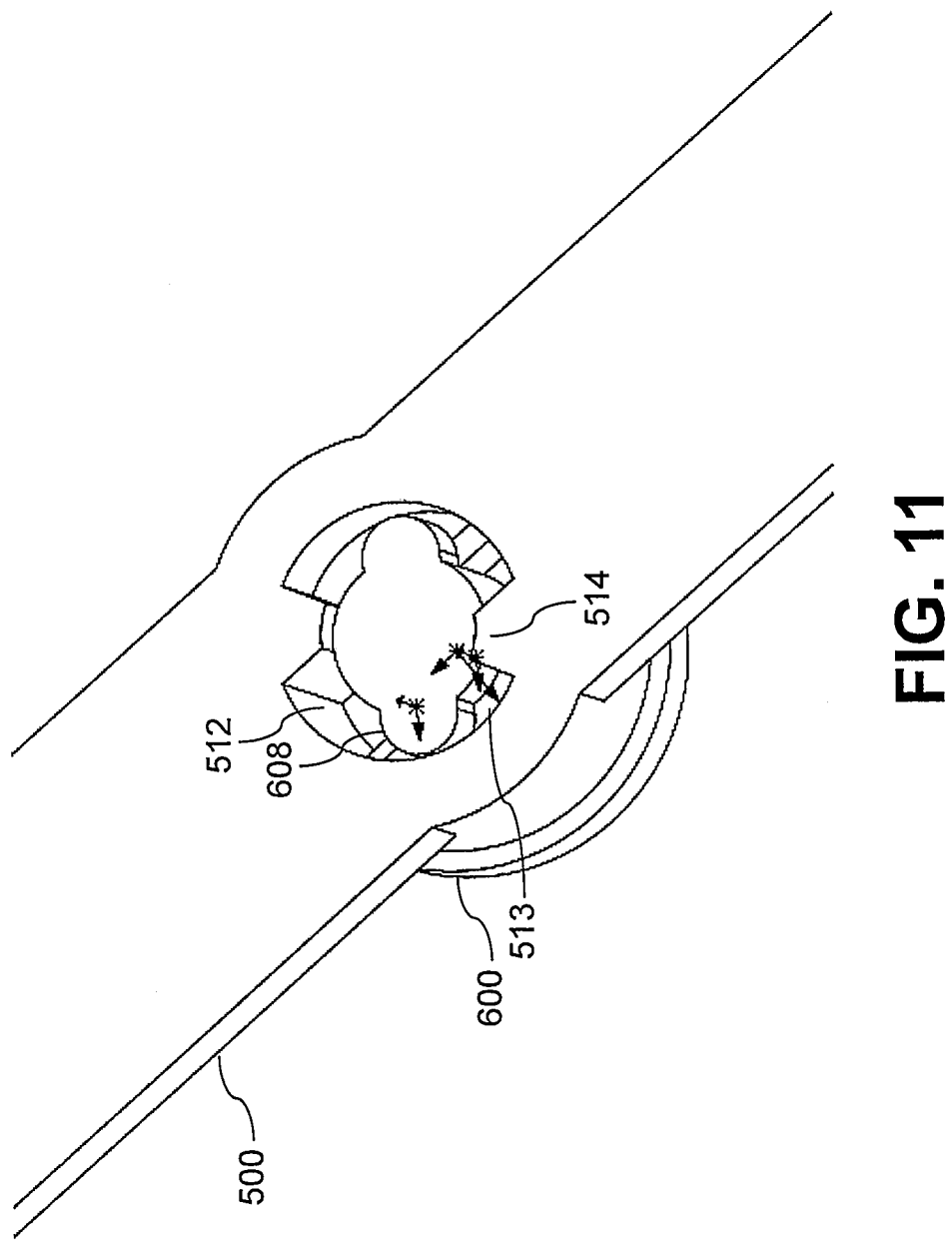
FIG. 11 illustrates the rotor of FIG. 7A being tightened onto the drive shaft of FIG. 8A.
Figure 12:
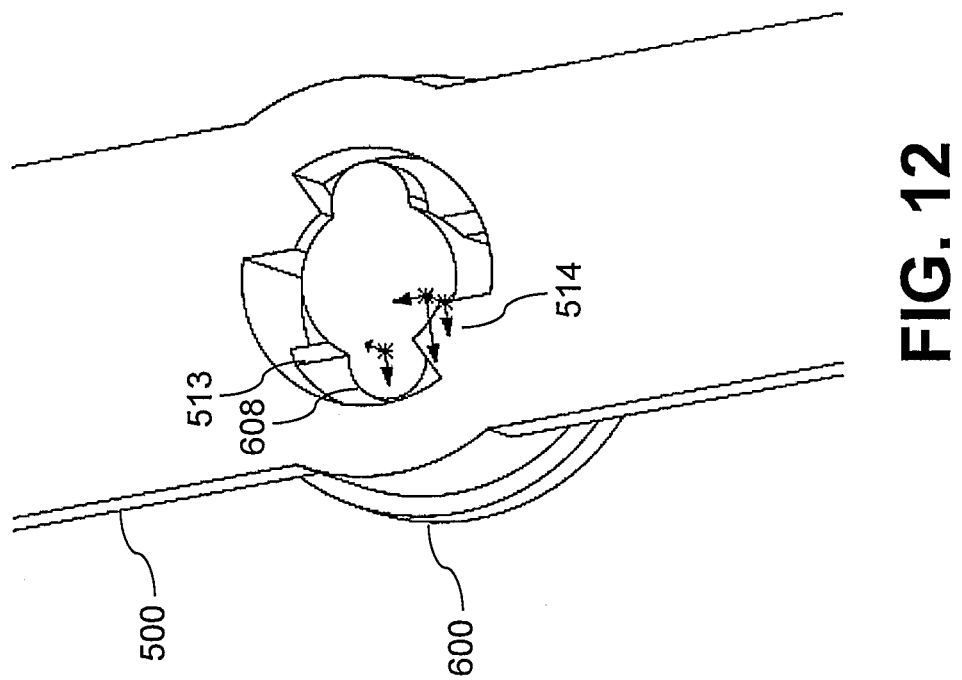
FIG. 12 illustrates the final locked position of the rotor of FIG. 7A on the drive shaft of FIG. 8A.

FIGS. 9-12 illustrate the rotor 500 being mounted onto the drive shaft 600. In FIG. 9, the rotor 500 and a portion of the drive shaft 600 are shown prior to mounting. In FIG. 10, the end of the drive shaft 600 is inserted into the hub 510 such that the protrusions 608 pass through the gaps 515 formed by the guides 513 within the aperture 512. To tighten the rotor 500 on the drive shaft 600, the rotor 500 can rotated be along a tightening direction relative to the drive shaft 600, depicted as a clockwise direction in FIG. 11. As the rotor 500 rotates, the protrusions 608 slide within the aperture 512 and over the upper surfaces of the guides 513 until they are pressed against the stops 514, thus tightening the coupling between the rotor 500 and the drive shaft 600. Optionally, the upper surfaces of the guides 513 can be angled upwards, such that the mating connection can be tightened as the protrusions 608 are advanced along the guides 513. Alternatively, the upper surfaces of the guides 513 may be flat. FIG. 12 illustrates the final locked position of the rotor 500 and drive shaft 600. In the locked position, the protrusions 608 can be configured to rest on the guides 513 in a position engaging the stops 514 such that the rotor 500 is prevented from becoming uncoupled from the drive shaft 600. For example, the protrusions 608 may be pressed against the upper surfaces of the guides 513 to prevent the rotor 500 from moving longitudinally relative to the drive shaft 600. Furthermore, in some embodiments, the rotor 500 can be configured to rotate in a direction opposite of the tightening direction, such that the rotor 500 is self-tightened onto the drive shaft 600 by the forces generated by the rotation, as described herein. For example, in the embodiments of FIGS. 9-12, the tightening direction is depicted as clockwise and the rotation direction counterclockwise, such that the protrusions 608 are held flush against the stops 514 by the counterclockwise rotation of the rotor 500. However, if the rotor 500 is configured to rotate in a clockwise direction, the fastening features 511, 606 can be configured such that the tightening direction for locking the rotor 500 is counterclockwise.

The systems, devices, and methods described herein can be applied to a wide variety of movable objects. As previously mentioned, any description herein of an aerial vehicle may apply to and be used for any movable object. A movable object of the present invention can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be mounted on a living subject, such as a human or an animal. Suitable animals can include avines, canines, felines, equines, bovines, ovines, porcines, delphines, rodents, or insects.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be a vehicle. Suitable vehicles may include water vehicles, aerial vehicles, space vehicles, or ground vehicles. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). A vehicle can be self-propelled, such as self-propelled through the air, on or in water, in space, or on or under the ground. A self-propelled vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user or controlled locally by an occupant within or on the movable object. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm$^3$, 500 cm, 750 cm$^3$, 1000 cm$^3$, 5000 cm$^3$, 10,000 cm$^3$, 100,000 cm$^3$, 1 m$^3$, or 10 m$^3$. Conversely, the total volume of the movable object may be greater than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm, 500 cm$^3$, 750 cm$^3$, 1000 cm$^3$, 5000 cm$^3$, 10,000 cm$^3$, 100,000 cm$^3$, 1 m$^3$, or 10 m$^3$.

In some embodiments, the movable object may have a footprint (which may refer to the lateral cross-sectional area encompassed by the movable object) less than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$. Conversely, the footprint may be greater than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$.

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail below. In some examples, a ratio of an movable object weight to a load weight may be greater than, less than, or equal to about 1:1. In some instances, a ratio of an movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of an movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

Figure 13:
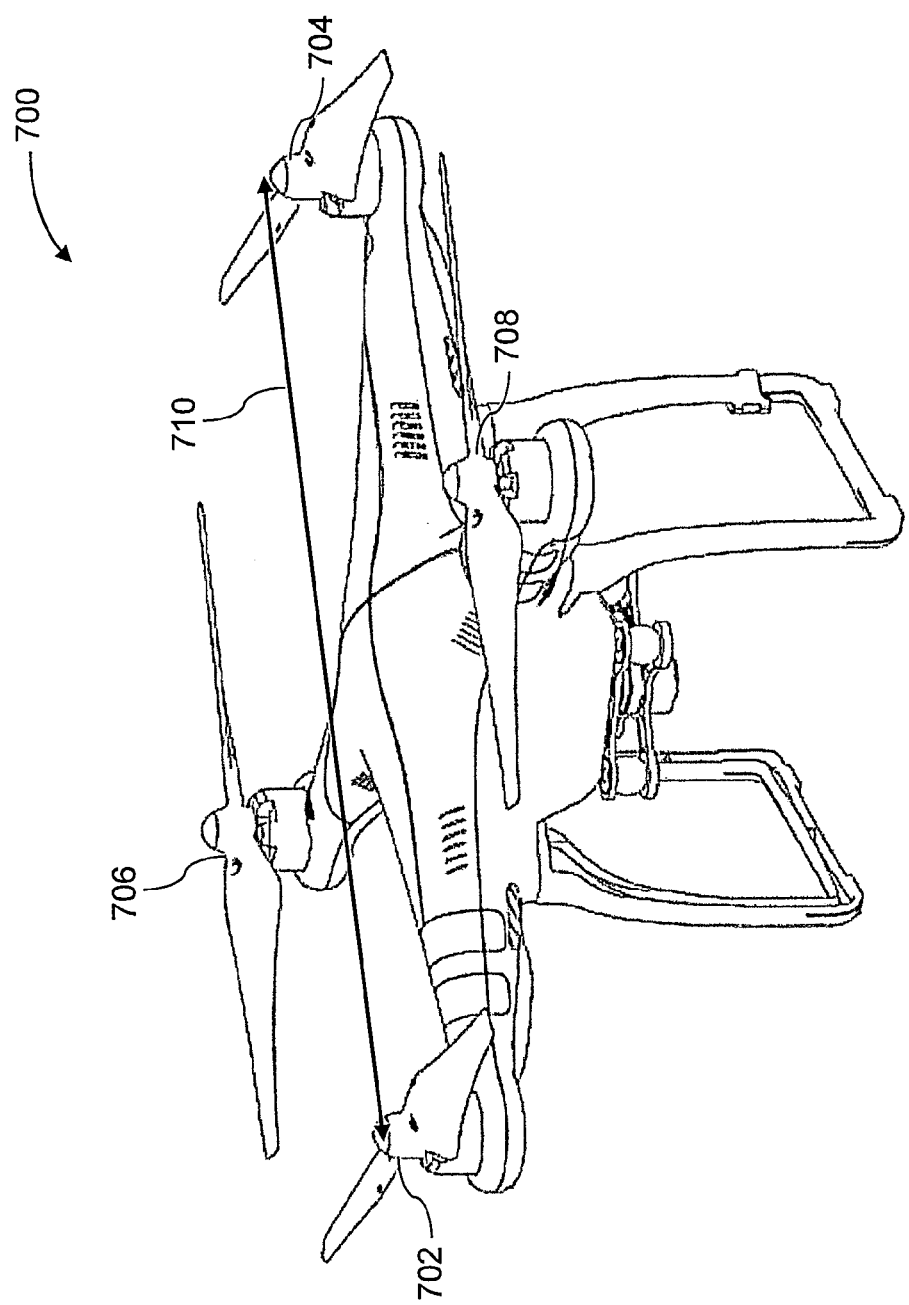
FIG. 13 illustrates an unmanned aerial vehicle, in accordance with embodiments.

FIG. 13 illustrates an unmanned aerial vehicle (UAV) 700, in accordance with embodiments of the present invention. The UAV may be an example of a movable object as described herein. The UAV 700 can include a propulsion system having four rotors 702, 704, 706, and 708. Any number of rotors may be provided (e.g., one, two, three, four, five, six, or more). The rotors can be embodiments of the self-tightening rotors described elsewhere herein. The rotors, rotor assemblies, or other propulsion systems of the unmanned aerial vehicle may enable the unmanned aerial vehicle to hover/maintain position, change orientation, and/or change location. The distance between shafts of opposite rotors can be any suitable length 710. For example, the length 710 can be less than or equal to 2 m, or less than equal to 5 m. In some embodiments, the length 710 can be within a range from 40 cm to 7 m, from 70 cm to 2 m, or from 5 cm to 5 m. Any description herein of a UAV may apply to a movable object, such as a movable object of a different type, and vice versa.

In some embodiments, the movable object can be configured to carry a load. The load can include one or more of passengers, cargo, equipment, instruments, and the like. The load can be provided within a housing. The housing may be separate from a housing of the movable object, or be part of a housing for an movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object).

In some embodiments, the load includes a payload. The payload can be configured not to perform any operation or function. Alternatively, the payload can be a payload configured to perform an operation or function, also known as a functional payload. For example, the payload can include one or more sensors for surveying one or more targets. Any suitable sensor can be incorporated into the payload, such as an image capture device (e.g., a camera), an audio capture device (e.g., a parabolic microphone), an infrared imaging device, or an ultraviolet imaging device. The sensor can provide static sensing data (e.g., a photograph) or dynamic sensing data (e.g., a video). In some embodiments, the sensor provides sensing data for the target of the payload. Alternatively or in combination, the payload can include one or more emitters for providing signals to one or more targets. Any suitable emitter can be used, such as an illumination source or a sound source. In some embodiments, the payload includes one or more transceivers, such as for communication with a module remote from the movable object. Optionally, the payload can be configured to interact with the environment or a target. For example, the payload can include a tool, instrument, or mechanism capable of manipulating objects, such as a robotic arm.

Optionally, the load may include a carrier. The carrier can be provided for the payload and the payload can be coupled to the movable object via the carrier, either directly (e.g., directly contacting the movable object) or indirectly (e.g., not contacting the movable object). Conversely, the payload can be mounted on the movable object without requiring a carrier. The payload can be integrally formed with the carrier. Alternatively, the payload can be releasably coupled to the carrier.

In some embodiments, the payload can include one or more payload elements, and one or more of the payload elements can be movable relative to the movable object and/or the carrier, as described above.

The carrier can be integrally formed with the movable object. Alternatively, the carrier can be releasably coupled to the movable object. The carrier can be coupled to the movable object directly or indirectly. The carrier can provide support to the payload (e.g., carry at least part of the weight of the payload). The carrier can include a suitable mounting structure (e.g., a gimbal platform) capable of stabilizing and/or directing the movement of the payload. In some embodiments, the carrier can be adapted to control the state of the payload (e.g., position and/or orientation) relative to the movable object. For example, the carrier can be configured to move relative to the movable object (e.g., with respect to one, two, or three degrees of translation and/or one, two, or three degrees of rotation) such that the payload maintains its position and/or orientation relative to a suitable reference frame regardless of the movement of the movable object. The reference frame can be a fixed reference frame (e.g., the surrounding environment). Alternatively, the reference frame can be a moving reference frame (e.g., the movable object, a payload target).

In some embodiments, the carrier can be configured to permit movement of the payload relative to the carrier and/or movable object. The movement can be a translation with respect to up to three degrees of freedom (e.g., along one, two, or three axes) or a rotation with respect to up to three degrees of freedom (e.g., about one, two, or three axes), or any suitable combination thereof.

In some instances, the carrier can include a carrier frame assembly and a carrier actuation assembly. The carrier frame assembly can provide structural support to the payload. The carrier frame assembly can include individual carrier frame components, some of which can be movable relative to one another. The carrier actuation assembly can include one or more actuators (e.g., motors) that actuate movement of the individual carrier frame components. The actuators can permit the movement of multiple carrier frame components simultaneously, or may be configured to permit the movement of a single carrier frame component at a time. The movement of the carrier frame components can produce a corresponding movement of the payload. For example, the carrier actuation assembly can actuate a rotation of one or more carrier frame components about one or more axes of rotation (e.g., roll axis, pitch axis, or yaw axis). The rotation of the one or more carrier frame components can cause a payload to rotate about one or more axes of rotation relative to the movable object. Alternatively or in combination, the carrier actuation assembly can actuate a translation of one or more carrier frame components along one or more axes of translation, and thereby produce a translation of the payload along one or more corresponding axes relative to the movable object.

In some embodiments, the movement of the movable object, carrier, and payload relative to a fixed reference frame (e.g., the surrounding environment) and/or to each other, can be controlled by a terminal. The terminal can be a remote control device at a location distant from the movable object, carrier, and/or payload. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touchscreen, or display. Any suitable user input can be used to interact with the terminal, such as manually entered commands, voice control, gesture control, or position control (e.g., via a movement, location or tilt of the terminal).

The terminal can be used to control any suitable state of the movable object, carrier, and/or payload. For example, the terminal can be used to control the position and/or orientation of the movable object, carrier, and/or payload relative to a fixed reference from and/or to each other. In some embodiments, the terminal can be used to control individual elements of the movable object, carrier, and/or payload, such as the actuation assembly of the carrier, a sensor of the payload, or an emitter of the payload. The terminal can include a wireless communication device adapted to communicate with one or more of the movable object, carrier, or payload.

The terminal can include a suitable display unit for viewing information of the movable object, carrier, and/or payload. For example, the terminal can be configured to display information of the movable object, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Optionally, the same terminal may both control the movable object, carrier, and/or payload, or a state of the movable object, carrier and/or payload, as well as receive and/or display information from the movable object, carrier and/or payload. For example, a terminal may control the positioning of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and/or display information from the movable object, carrier, and/or payload. For example, a first terminal may be used to control the positioning of the payload relative to an environment while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

Figure 14:
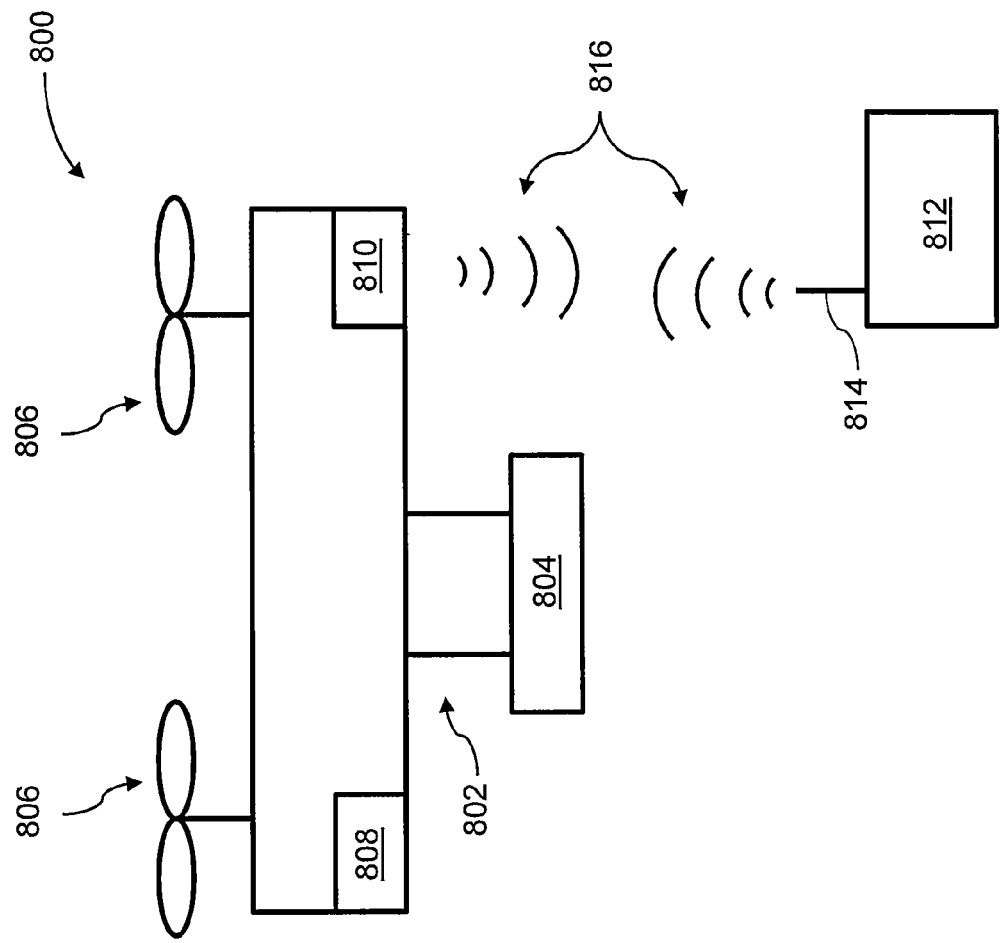
FIG. 14 illustrates a movable object including a carrier and a payload, in accordance with embodiments.

FIG. 14 illustrates a movable object 800 including a carrier 802 and a payload 804, in accordance with embodiments. Although the movable object 800 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV). In some instances, the payload 804 may be provided on the movable object 800 without requiring the carrier 802. The movable object 800 may include propulsion mechanisms 806, a sensing system 808, and a communication system 810.

The propulsion mechanisms 806 can include one or more of rotors, propellers, blades, engines, motors, wheels, axles, magnets, or nozzles, as previously described. For example, the propulsion mechanisms 806 may be self-tightening rotors, rotor assemblies, or other rotary propulsion units, as disclosed elsewhere herein. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 806 can be mounted on the movable object 800 using any suitable means, such as a support element (e.g., a drive shaft) as described elsewhere herein. The propulsion mechanisms 806 can be mounted on any suitable portion of the movable object 800, such on the top, bottom, front, back, sides, or suitable combinations thereof.

In some embodiments, the propulsion mechanisms 806 can enable the movable object 800 to take off vertically from a surface or land vertically on a surface without requiring any horizontal movement of the movable object 800 (e.g., without traveling down a runway). Optionally, the propulsion mechanisms 806 can be operable to permit the movable object 800 to hover in the air at a specified position and/or orientation. One or more of the propulsion mechanisms 800 may be controlled independently of the other propulsion mechanisms. Alternatively, the propulsion mechanisms 800 can be configured to be controlled simultaneously. For example, the movable object 800 can have multiple horizontally oriented rotors that can provide lift and/or thrust to the movable object. The multiple horizontally oriented rotors can be actuated to provide vertical takeoff, vertical landing, and hovering capabilities to the movable object 800. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 800 (e.g., with respect to up to three degrees of translation and up to three degrees of rotation).

The sensing system 808 can include one or more sensors that may sense the spatial disposition, velocity, and/or acceleration of the movable object 800 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 808 can be used to control the spatial disposition, velocity, and/or orientation of the movable object 800 (e.g., using a suitable processing unit and/or control module, as described below). Alternatively, the sensing system 808 can be used to provide data regarding the environment surrounding the movable object, such as weather conditions, proximity to potential obstacles, location of geographical features, location of manmade structures, and the like.

The communication system 810 enables communication with terminal 812 having a communication system 814 via wireless signals 816. The communication systems 810, 814 may include any number of transmitters, receivers, and/or transceivers suitable for wireless communication. The communication may be one-way communication, such that data can be transmitted in only one direction. For example, one-way communication may involve only the movable object 800 transmitting data to the terminal 812, or vice-versa. The data may be transmitted from one or more transmitters of the communication system 810 to one or more receivers of the communication system 812, or vice-versa. Alternatively, the communication may be two-way communication, such that data can be transmitted in both directions between the movable object 800 and the terminal 812. The two-way communication can involve transmitting data from one or more transmitters of the communication system 810 to one or more receivers of the communication system 814, and vice-versa.

In some embodiments, the terminal 812 can provide control data to one or more of the movable object 800, carrier 802, and payload 804 and receive information from one or more of the movable object 800, carrier 802, and payload 804 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 806), or a movement of the payload with respect to the movable object (e.g., via control of the carrier 802). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 808 or of the payload 804). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 812 can be configured to control a state of one or more of the movable object 800, carrier 802, or payload 804. Alternatively or in combination, the carrier 802 and payload 804 can also each include a communication module configured to communicate with terminal 812, such that the terminal can communicate with and control each of the movable object 800, carrier 802, and payload 804 independently.

In some embodiments, the movable object 800 can be configured to communicate with another remote device in addition to the terminal 812, or instead of the terminal 812. The terminal 812 may also be configured to communicate with another remote device as well as the movable object 800. For example, the movable object 800 and/or terminal 812 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 800, receive data from the movable object 800, transmit data to the terminal 812, and/or receive data from the terminal 812. Optionally, the remote device can be connected to the Internet or other telecommunications network, such that data received from the movable object 800 and/or terminal 812 can be uploaded to a website or server.

Figure 15:
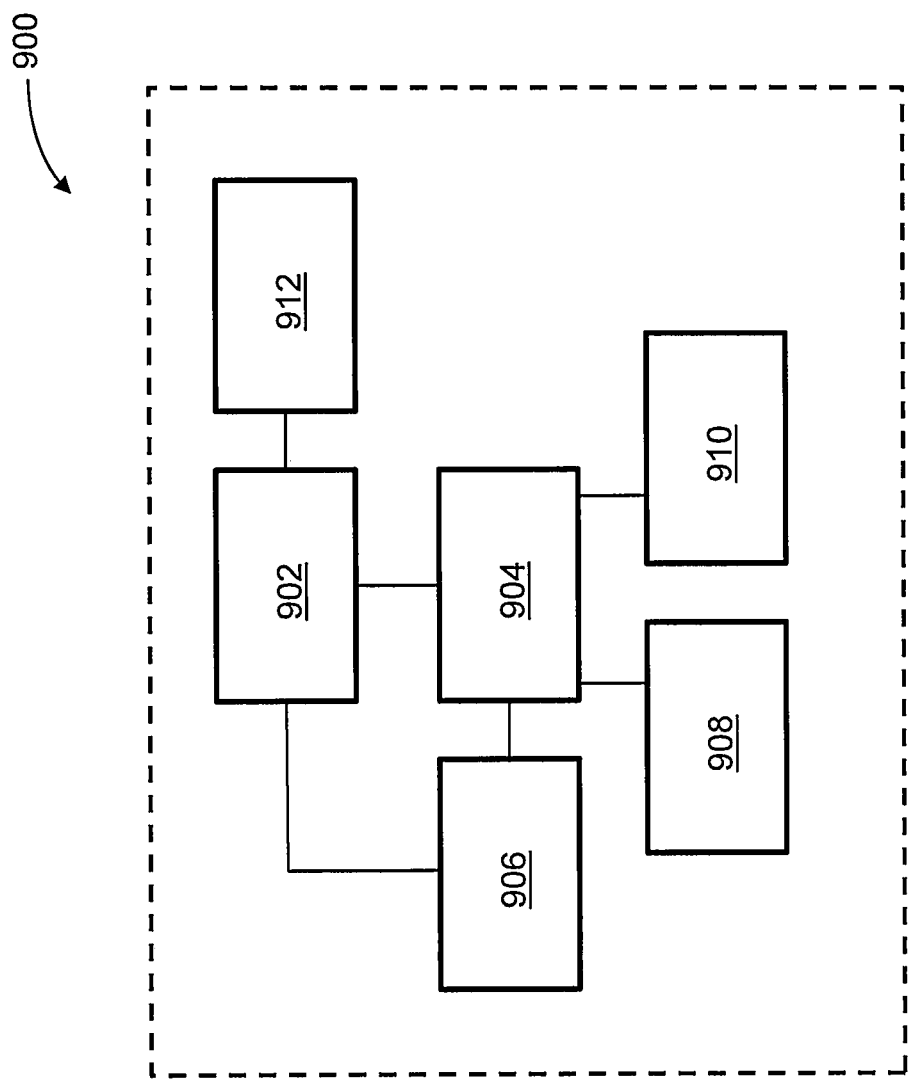
FIG. 15 is a schematic illustration by way of block diagram of a system for controlling a movable object, in accordance with embodiments.

FIG. 15 is a schematic illustration by way of block diagram of a system 900 for controlling a movable object, in accordance with embodiments. The system 900 can be used in combination with any suitable embodiment of the systems, devices, and methods disclosed herein. The system 900 can include a sensing module 902, processing unit 904, non-transitory computer readable medium 906, control module 908, and communication module 910.

The sensing module 902 can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module 902 can be operatively coupled to a processing unit 904 having a plurality of processors. In some embodiments, the sensing module can be operatively coupled to a transmission module 912 (e.g., a Wi-Fi image transmission module) configured to directly transmit sensing data to a suitable external device or system. For example, the transmission module 912 can be used to transmit images captured by a camera of the sensing module 902 to a remote terminal.

The processing unit 904 can have one or more processors, such as a programmable processor (e.g., a central processing unit (CPU)). The processing unit 904 can be operatively coupled to a non-transitory computer readable medium 906. The non-transitory computer readable medium 906 can store logic, code, and/or program instructions executable by the processing unit 904 for performing one or more steps. The non-transitory computer readable medium can include one or more memory units (e.g., removable media or external storage such as an SD card or random access memory (RAM)). In some embodiments, data from the sensing module 902 can be directly conveyed to and stored within the memory units of the non-transitory computer readable medium 906. The memory units of the non-transitory computer readable medium 906 can store logic, code and/or program instructions executable by the processing unit 904 to perform any suitable embodiment of the methods described herein. For example, the processing unit 904 can be configured to execute instructions causing one or more processors of the processing unit 904 to analyze sensing data produced by the sensing module. The memory units can store sensing data from the sensing module to be processed by the processing unit 904. In some embodiments, the memory units of the non-transitory computer readable medium 906 can be used to store the processing results produced by the processing unit 904.

In some embodiments, the processing unit 904 can be operatively coupled to a control module 908 configured to control a state of the movable object. For example, the control module 908 can be configured to control the propulsion mechanisms of the movable object to adjust the spatial disposition, velocity, and/or acceleration of the movable object with respect to six degrees of freedom. Alternatively or in combination, the control module 908 can control one or more of a state of a carrier, payload, or sensing module.

The processing unit 904 can be operatively coupled to a communication module 910 configured to transmit and/or receive data from one or more external devices (e.g., a terminal, display device, or other remote controller). Any suitable means of communication can be used, such as wired communication or wireless communication. For example, the communication module 910 can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module 910 can transmit and/or receive one or more of sensing data from the sensing module 902, processing results produced by the processing unit 904, predetermined control data, user commands from a terminal or remote controller, and the like.

The components of the system 900 can be arranged in any suitable configuration. For example, one or more of the components of the system 900 can be located on the movable object, carrier, payload, terminal, sensing system, or an additional external device in communication with one or more of the above. Additionally, although FIG. 15 depicts a single processing unit 904 and a single non-transitory computer readable medium 906, one of skill in the art would appreciate that this is not intended to be limiting, and that the system 900 can include a plurality of processing units and/or non-transitory computer readable media. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system 900 can occur at one or more of the aforementioned locations.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A multi-rotor self-propelled movable object, the movable object comprising:
   (a) a first rotor assembly comprising:
      a first hub coupled to a first plurality of blades;
      a first adapter coupled to the first hub and comprising a first fastening feature; and
      a first drive shaft comprising a second fastening feature and coupled to the first hub through the first adapter by a mating connection of the first and second fastening features, wherein the first drive shaft is configured to cause rotation of the first hub in a first direction, and the mating connection of the first and second fastening features is able to be tightened by the rotation of the first drive shaft in only the first direction,
   wherein the first plurality of blades coupled to the first hub are configured to rotate therewith in the first direction to generate a first propulsive force; and
   (b) a second rotor assembly comprising:
      a second hub coupled to a second plurality of blades;
      a second adapter coupled to the second hub and comprising a third fastening feature;
      a second drive shaft comprising a fourth fastening feature and coupled to the second hub through the second adapter by a mating connection of the third and fourth fastening features, wherein the second drive shaft is configured to cause rotation of the second hub in a second direction that is opposite to the first direction, and the mating connection of the third and fourth fastening features is able to be tightened by the rotation of the second drive shaft in only the second direction, wherein the second plurality of blades coupled to the second hub are configured to rotate therewith in the second direction to generate a second propulsive force, wherein (1) the first fastening feature of the first adapter is threaded in a right-handed direction and the third fastening feature of the second adapter is threaded in a left-handed direction, or (2) the first fastening feature of the first adapter is threaded in a left-handed direction and the third fastening feature of the second adapter is threaded in a right-handed direction, wherein the second fastening feature is threaded to mate with the first fastening feature of the first adapter, and the fourth fastening feature is threaded to mate with the third fastening feature, wherein the first propulsive force (1) includes a lift component that provides lift to the movable object, and (2) is imparted via contact between the first hub, the first adapter and the first drive shaft; and wherein the second propulsive force (1) includes a lift component that provides lift to the movable object, and (2) is imparted via contact between the second hub, the second adapter and the second drive shaft, and wherein the rotation of the first hub in the first direction imparts a rotational force component that is transmitted from the first drive shaft to the first hub via contact between the first fastening feature and the second fastening feature, and wherein the rotation of the second hub in the second direction imparts a rotational force component that is transmitted from the second drive shaft to the second hub via contact between the third fastening feature and the fourth fastening feature.

2. The movable object of claim 1, wherein the self-propelled movable object is an unmanned aerial vehicle.

3. The movable object of claim 1, wherein the first plurality of blades coupled to the first hub are integrally formed with the first hub or the second plurality of blades coupled to the second hub are integrally formed with the second hub.

4. The movable object of claim 1, further comprising a drive unit configured to drive the first drive shaft or the second drive shaft, wherein the drive unit comprises a motor that rotates, thereby driving the first drive shaft or the second drive shaft.

5. The movable object of claim 1, wherein the first adapter is formed from a material having greater durability than a material of the first hub, or the second adapter is formed from a material having greater durability than a material of the second hub.

6. The movable object of claim 1, wherein the first fastening feature is integrally formed with the first adapter, or the third fastening feature is integrally formed with the second adapter.

7. The movable object of claim 1, wherein the first adapter is coupled to a cavity of the first hub, or the second adapter is coupled to a cavity of the second hub.

8. The movable object of claim 7, wherein the first adapter is coupled to the cavity of the first hub via a threaded connection, or the second adapter is coupled to the cavity of the second hub via a threaded connection.

9. The movable object of claim 1, wherein the first adapter is fixedly coupled to the first hub, or the second adapter is fixedly coupled to the second hub.

10. The movable object of claim 9, wherein the first adapter is not detachable from the first hub, or the second adapter is not detachable from the second hub.

11. The movable object of claim 1, wherein the first adapter is releasably coupled to the first hub, or the second adapter is releasably coupled to the second hub.

12. The movable object of claim 1, wherein the first adapter is coupled to at least one protrusion of the first hub, or the second adapter is coupled to at least one protrusion of the second hub.

13. The movable object of claim 12, wherein the first adapter is coupled to the protrusion of the first hub via a threaded connection, or the second adapter is coupled to the protrusion of the second hub via a threaded connection.

14. The movable object of claim 1, wherein the lift component of the first propulsive force (2) is imparted via contact between threads of the first adapter and threads of the first drive shaft; and wherein the lift component of the second propulsive force is imparted via contact between threads of the second adapter and threads of the second drive shaft.

15. The movable object of claim 1, wherein the first hub further comprises a fifth fastening feature and the first adapter comprises a sixth fastening feature, such that the first adapter is coupled to the first hub by a mating connection of the fifth and sixth fastening features, and wherein the second hub further comprises a seventh fastening feature and the second adapter comprises an eighth fastening feature, such that the second adapter is coupled to the second hub by a mating connection of the seventh and eighth fastening features.

16. The movable object of claim 15, wherein the mating connection of the fifth and sixth fastening features is able to be tightened by the rotation of the first drive shaft in only the first direction, and wherein the mating connection of the seventh and eighth fastening features is able to be tightened by the rotation of the second drive shaft in only the second direction.

17. A multi-rotor self-propelled movable object, the movable object comprising:
(a) a first rotor assembly comprising:
a first hub coupled to a first plurality of blades and comprising a first fastening feature;
a first adapter coupled to the first hub and comprising a second fastening feature; and
a first drive shaft coupled to the first hub through the first adapter by a mating connection of the first and second fastening features, wherein the first drive shaft is configured to cause rotation of the first hub in a first direction, and the mating connection of the first and second fastening features is able to be tightened by the rotation of the first drive shaft in only the first direction,
wherein the first plurality of blades coupled to the first hub are configured to rotate therewith in the first direction to generate a first propulsive force; and
(b) a second rotor assembly comprising:
a second hub coupled to a second plurality of blades comprising a third fastening feature;
a second adapter coupled to the second hub and comprising a fourth fastening feature;
a second drive shaft coupled to the second hub through the second adapter by a mating connection of the third and fourth fastening features, wherein the second drive shaft is configured to cause rotation of the second hub in a second direction that is opposite to the first direction, and the mating connection of the third and fourth fastening features is able to be tightened by the rotation of the second drive shaft in only the second direction,
wherein the second plurality of blades coupled to the second hub are configured to rotate therewith in the second direction to generate a second propulsive force,
wherein (1) the first fastening feature of the first adapter is threaded in a right-handed direction and the third fastening feature of the second adapter is threaded in a left-handed direction, or (2) the first fastening feature of the first adapter is threaded in a left-handed direction and the third fastening feature of the second adapter is threaded in a right-handed direction, wherein the second fastening feature is threaded to mate with the first fastening feature of the first adapter, and the fourth fastening feature is threaded to mate with the third fastening feature, wherein the first propulsive force (1) includes a lift component that provides lift to the movable object, and (2) is imparted via contact between the first hub, the first adapter and the first drive shaft; and wherein the second propulsive force (1) includes a lift component that provides lift to the movable object, and (2) is imparted via contact between the second hub, the second adapter and the second drive shaft, and wherein the rotation of the first hub in the first direction imparts a rotational force component that is transmitted from the first drive shaft to the first hub via contact between the first fastening feature and the second fastening feature, and wherein the rotation of the second hub in the second direction imparts a rotational force component that is transmitted from the second drive shaft to the second hub via contact between the third fastening feature and the fourth fastening feature.

18. The movable object of claim 17, wherein the self-propelled movable object is an unmanned aerial vehicle.

19. The movable object of claim 17, wherein the first plurality of blades coupled to the first hub are integrally formed with the first hub or the second plurality of blades coupled to the second hub are integrally formed with the second hub.

20. The movable object of claim 17, further comprising a drive unit configured to drive the first drive shaft or the second drive shaft, wherein the drive unit comprises a motor that rotates, thereby driving the first drive shaft or the second drive shaft.

21. The movable object of claim 17, wherein the first adapter is formed from a material having greater durability than a material of the first hub, or the second adapter is formed from a material having greater durability than a material of the second hub.

22. The movable object of claim 17, wherein the lift component of the first propulsive force (2) is imparted via contact between threads of the first hub and threads of the first adapter; and wherein the lift component of the second propulsive force is imparted via contact between threads of the second hub and threads of the second adapter.

* * * * *